(12) United States Patent
Kim et al.

(10) Patent No.: US 11,686,967 B2
(45) Date of Patent: Jun. 27, 2023

(54) VIEWING ANGLE COMPENSATION FILM, POLARIZING PLATE COMPRISING SAME, AND DISPLAY DEVICE COMPRISING SAME

(71) Applicant: LG CHEM, LTD., Seoul (KR)

(72) Inventors: Byung Mook Kim, Daejeon (KR); Sunghak Bae, Daejeon (KR); Do Ki Chang, Daejeon (KR); Kyungki Hong, Daejeon (KR); Dae Hee Lee, Daejeon (KR); Sangcholl Han, Daejeon (KR); Youngjin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/757,741

(22) PCT Filed: Feb. 27, 2019

(86) PCT No.: PCT/KR2019/002374
§ 371 (c)(1),
(2) Date: Apr. 20, 2020

(87) PCT Pub. No.: WO2019/168345
PCT Pub. Date: Sep. 6, 2019

(65) Prior Publication Data
US 2021/0191186 A1 Jun. 24, 2021

(30) Foreign Application Priority Data
Feb. 28, 2018 (KR) .................. 10-2018-0024548

(51) Int. Cl.
*G02F 1/1335* (2006.01)
(52) U.S. Cl.
CPC .. *G02F 1/133502* (2013.01); *G02F 1/133528* (2013.01)

(58) Field of Classification Search
CPC .................. G02F 1/133502; G02F 1/133528
See application file for complete search history.

(56) References Cited

U.S. PATENT DOCUMENTS

| | | | |
|---|---|---|---|
| 10,007,139 | B2 | 6/2018 | Oh et al. |
| 2001/0004275 | A1 | 6/2001 | Umemoto et al. |

(Continued)

FOREIGN PATENT DOCUMENTS

| | | |
|---|---|---|
| CN | 103885106 A | 6/2014 |
| JP | H06-027325 A | 2/1994 |

(Continued)

*Primary Examiner* — Phu Vu
(74) *Attorney, Agent, or Firm* — Dentons US LLP (57) ABSTRACT

The present specification relates to a viewing angle compensation film, a polarizing plate including the same, and a display device including the same, and the viewing angle compensation film includes: a pattern layer; and a low refractive layer, in which a difference in refractive index between the pattern layer and the low refractive layer is 0.02 to 0.4, the pattern layer includes: a first surface which comprises a flat surface; and a second surface which faces the first surface and includes multiple protruding portions, each of the protruding portions includes a first inclined surface and a second inclined surface, an angle $\theta_1$ between the first surface and the first inclined surface or a surface extending from the first inclined surface and an angle $\theta_2$ between the first surface and the second inclined surface or a surface extending from the second inclined surface are different from each other, and an angle $\theta$ between the first inclined surface or the surface extending from the first inclined surface and the second inclined surface or the surface extending from the second inclined surface is 20° to 60°, such that there is an effect of improving a contrast ratio and a viewing angle.

2 Claims, 10 Drawing Sheets

(56) References Cited

U.S. PATENT DOCUMENTS

| | | | |
|---|---|---|---|
| 2003/0048400 A1* | 3/2003 | Kim | G02F 1/133504 |
| | | | 349/117 |
| 2007/0002586 A1 | 1/2007 | Soh et al. | |
| 2007/0284991 A1* | 12/2007 | Egi | C09K 11/06 |
| | | | 313/479 |
| 2012/0087012 A1* | 4/2012 | Imaoku | G02B 1/118 |
| | | | 359/601 |
| 2014/0119033 A1* | 5/2014 | Vasylyev | F21V 5/02 |
| | | | 362/327 |
| 2014/0175404 A1 | 6/2014 | Shim et al. | |
| 2015/0043221 A1* | 2/2015 | Lee | G02B 5/0236 |
| | | | 362/311.06 |
| 2015/0293392 A1 | 10/2015 | Yanai et al. | |
| 2016/0187682 A1* | 6/2016 | Oh | G02B 5/045 |
| | | | 349/96 |
| 2016/0252665 A1 | 9/2016 | Lee et al. | |
| 2017/0160582 A1 | 6/2017 | He | |

FOREIGN PATENT DOCUMENTS

| | | |
|---|---|---|
| JP | 2007-011267 A | 1/2007 |
| JP | 2009109969 A | 5/2009 |
| KR | 2001-0062553 A | 7/2001 |
| KR | 10-0784806 B1 | 12/2007 |
| KR | 10-0786384 B1 | 12/2007 |
| KR | 10-2008-0002242 A | 1/2008 |
| KR | 10-0806165 B1 | 2/2008 |
| KR | 10-2012-0127897 A | 11/2012 |
| KR | 10-2013-0005409 A | 1/2013 |
| KR | 10-2016-0077564 A | 7/2016 |
| KR | 10-2016-0081784 A | 7/2016 |
| KR | 10-2016-0105276 A | 9/2016 |
| TW | 200636351 A | 10/2006 |
| WO | 2005/017581 A2 | 2/2005 |
| WO | 2006/088930 A2 | 8/2006 |

* cited by examiner

VIEWING ANGLE COMPENSATION FILM, POLARIZING PLATE COMPRISING SAME, AND DISPLAY DEVICE COMPRISING SAME

The present application is a National Phase entry pursuant to 35 U.S.C. § 371 of International Application No. PCT/KR2019/002374 filed on Feb. 27, 2019, and claims priority to and the benefit of Korean Patent Application No. 10-2018-0024548 filed in the Korean Intellectual Property Office on Feb. 28, 2018, the entire contents of which are incorporated herein by reference.

FIELD

The present specification relates to a viewing angle compensation film, a polarizing plate comprising the same, and a display device comprising the same.

BACKGROUND

A liquid crystal display device is one of the flat panel displays which are widely used for mobile phones, small-sized portable electronic devices, or large-sized electronic devices such as personal computers or televisions, and the use of the liquid crystal display device is gradually being expanded.

Places and positions where the display devices are placed are diversified as the use of the display devices is expanded, but there is a problem in that it is impossible to obtain clear images when viewing the flat panel display in directions other than a direction from the front side of the flat panel display. In particular, in the case of a display for a vehicle, there is a problem in that it is impossible to obtain clear images within a driver's visual field because the position of the display and the driver's line of sight are not parallel to each other.

Therefore, there is a need for development on a display device capable of improving a viewing angle and a contrast ratio in order to solve the above-mentioned problems.

(Patent Document) Korean Patent No. 10-1210985.

SUMMARY

An object of the present specification is to provide a viewing angle compensation film, a polarizing plate comprising the same, and a display device comprising the same.

One exemplary embodiment of the present specification provides a viewing angle compensation film comprising: a pattern layer; and a low refractive layer, in which a difference in refractive index between the pattern layer and the low refractive layer is 0.02 to 0.4, wherein the pattern layer comprises: a first surface which comprises a flat surface; and a second surface which faces the first surface and comprises multiple protruding portions, each of the protruding portions comprises a first inclined surface and a second inclined surface, an angle $\theta_1$ between the first surface and the first inclined surface or a surface extending from the first inclined surface, and an angle $\theta_2$ between the first surface and the second inclined surface or a surface extending from the second inclined surface, wherein $\theta_i$ and $\theta_2$ are different from each other, and an angle $\theta$ between the first inclined surface or the surface extending from the first inclined surface and the second inclined surface or the surface extending from the second inclined surface, is 20° to 60°.

The present specification provides a polarizing plate comprising the viewing angle compensation film.

In addition, the present specification provides a screen display device comprising: a liquid crystal cell; a first polarizing plate which is provided at a visual field side of the liquid crystal cell; a second polarizing plate which is provided at the opposite side to the visual field side of the liquid crystal cell; and a back light unit which is provided at a side of the second polarizing plate opposite to a side that faces the liquid crystal cell, in which the first polarizing plate or the second polarizing plate comprises the viewing angle compensation film.

The viewing angle compensation film according to the present invention comprises the pattern layer and the low refractive layer, the difference in refractive index between the pattern layer and the low refractive layer is 0.02 to 0.4, wherein the pattern layer comprises a first surface which comprises a flat surface, and a second surface which comprises multiple protruding portions each comprising the first inclined surface and the second inclined surface, the angle $\theta_1$ between the first surface and the first inclined surface or the surface extending from the first inclined surface and the angle $\theta_2$ between the first surface and the second inclined surface or the surface extending from the second inclined surface, wherein $\theta_1$ and $\theta_2$ are different from each other, and the angle $\theta$ between the first inclined surface or the surface extending from the first inclined surface and the second inclined surface or the surface extending from the second inclined surface, is 20° to 60°, and as a result, a contrast ratio and a viewing angle of the screen display device comprising the viewing angle compensation film may be improved, and it is possible to obtain a clear image within a driver's visual field when the screen display device is used as a display device for a vehicle.

REFERENCE NUMERAL INDEX

10: Base film;
11: Pattern layer;
12: Low refractive layer;
13: Polarizer;
14: First optical layer; and
15: Second optical layer

DETAILED DESCRIPTION

Hereinafter, exemplary embodiments of the present invention will be described. However, the exemplary embodiments of the present invention may be modified in various forms, and the scope of the present invention is not limited to the following exemplary embodiments. Further, the exemplary embodiments of the present invention are provided to more completely explain the present invention to those skilled in the art.

A viewing angle compensation film according to one exemplary embodiment of the present invention comprises a pattern layer and a low refractive layer. In this case, a difference in refractive index between the pattern layer and the low refractive layer is 0.02 to 0.4. The pattern layer comprises a first surface which comprises a flat surface, and a second surface which faces the first surface and comprises multiple protruding portions. Each of the protruding portions comprises a first inclined surface and a second inclined surface. An angle $\theta_1$ between the first surface and the first inclined surface or a surface extending from the first inclined surface and an angle $\theta_2$ between the first surface and the second inclined surface or a surface extending from the second inclined surface, are different from each other. An angle $\theta$ between the first inclined surface or the surface extending from the first inclined surface and the second inclined surface or the surface extending from the second inclined surface is 20° to 60°.

Figure 1:
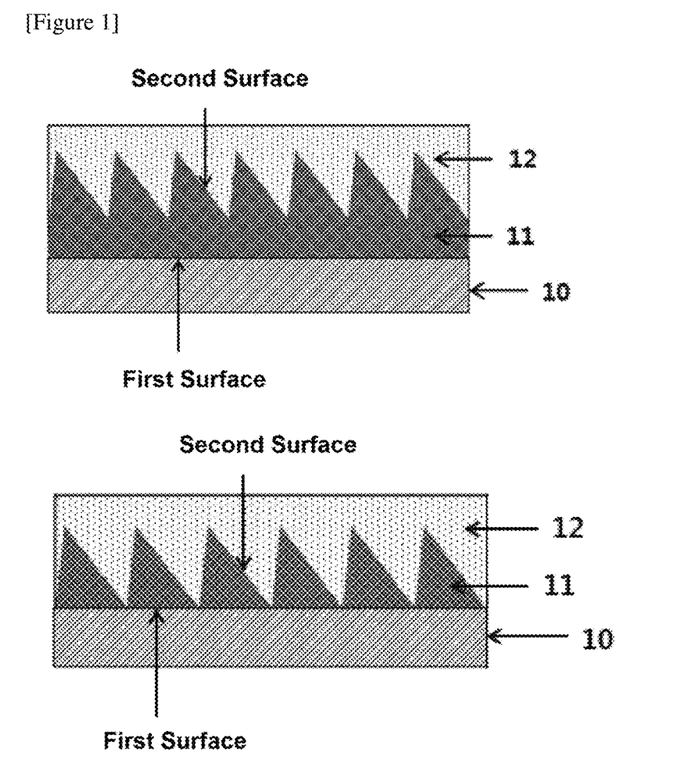
FIG. 1 is a schematic illustration of a viewing angle compensation film according to an exemplary embodiment of the present invention.

FIG. 1 illustrates the viewing angle compensation film according to one exemplary embodiment of the present invention. The viewing angle compensation film illustrated in FIG. 1 comprises a base film 10, a pattern layer 11, and a low refractive layer 12.

In the present invention, the term "visual field side" means a side or a direction where a polarizing plate is disposed to face a viewer when the polarizing plate is mounted in a display device such as a liquid crystal display device.

In the present invention, the "extension" means that a straight line or a plane extends long while maintaining a gradient thereof.

On the contrary, the term "opposite side to visual field side" means a side or a direction where the polarizing plate is disposed to face a side opposite to a viewer, that is, faces a backlight unit when the polarizing plate is mounted in a display device such as a liquid crystal display device.

According to one exemplary embodiment of the present invention, the multiple protruding portions provided on the second surface may be continuously disposed. In the case in which the multiple protruding portions are continuously provided, the pattern layer may be formed such that the first inclined surface of one protruding portion and the second inclined surface of another protruding portion are in contact with each other.

According to another exemplary embodiment, the multiple protruding portions may not be continuously provided.

According to one exemplary embodiment of the present invention, at least one cross section perpendicular to the first surface of the pattern layer may be triangular, quadrangular, or pentagonal.

In the case in which at least one cross section perpendicular to the first surface of the protruding portion is triangular, one end of the first inclined surface is in contact with an end of the second inclined surface, the other end of the first inclined surface is in contact with the first surface, and an end of the second inclined surface, which is not in contact with the end of the first inclined surface, is in contact with the first surface.

In the case in which at least one cross section perpendicular to the first surface of the protruding portion is quadrangular, one end of the first inclined surface and one end of the second inclined surface are in contact with the first surface, and a third inclined surface is provided to be in contact with the other end of the first inclined surface and the other end of the second inclined surface. Alternatively, one end of the first inclined surface is in contact with the first surface, the other end of the first inclined surface is in contact with an end of the second inclined surface, and a third inclined surface is provided to be in contact with the first surface and with an end of the second inclined surface which is not in contact with the end of the first inclined surface.

In the case in which at least one cross section perpendicular to the first surface of the protruding portion is pentagonal, the multiple protruding portions are continuously formed, each of the protruding portions comprises the first inclined surface and the second inclined surface, and an end of the first inclined surface of one protruding portion and an end of the second inclined surface of another protruding portion adjacent to the one protruding portion are in contact with each other, but the first inclined surface and the second inclined surface are not in contact with the first surface.

In the present invention, an angle $\theta$ between the first inclined surface or a surface extending from the first inclined surface and the second inclined surface or a surface extending from the second inclined surface may be 20° to 60° or may be 30° to 50° or 40° to 50° as another example. In the case in which the angle $\theta$ between the first inclined surface or the surface extending from the first inclined surface and the second inclined surface or the surface extending from the second inclined surface is within the above-mentioned range, it is possible to obtain an effect of adjusting a viewing angle of a display device and improving a contrast ratio by adjusting a refraction angle so that light incident on the viewing angle compensation film defines a light concentration shape.

In one exemplary embodiment of the present invention, an angle $\theta_1$ between the first surface and the first inclined surface or the surface extending from the first inclined surface and an angle $\theta_2$ between the first surface and the second inclined surface or the surface extending from the second inclined surface are different from each other. Since the angle $\theta_1$ and the angle $\theta_2$ have different values, the viewing angle and the contrast ratio are improved by adjusting a refraction angle of the light incident on the pattern layer. In this case, the angle $\theta_1$ may be 60° to 90°, 70° to 90°, or 80° to 90°, and the angle $\theta_2$ may be 20° to 80°, 30° to 70°, or 40° to 60°.

In one exemplary embodiment of the present invention, each of the first inclined surface and the second inclined surface is a flat surface.

In one exemplary embodiment of the present invention, the low refractive layer is provided at a second surface side of the pattern layer.

In another exemplary embodiment, the low refractive layer is provided to be in contact with the second surface of the pattern layer.

In another exemplary embodiment, the low refractive layer is provided at a first surface side of the pattern layer.

In another exemplary embodiment, the low refractive layer is provided to be in contact with the first surface of the pattern layer.

A difference in refractive index between the pattern layer and the low refractive layer may be 0.02 to 0.4, and particularly, 0.03 to 0.2. In this case, a refractive index of the pattern layer may be about 1.45 to 1.65, and a refractive index of the low refractive layer may be 1.40 to 1.55. The refractive index is measured at a wavelength of 380 nm to 780 nm.

A material of the pattern layer may be, but not limited to, ultraviolet ray curable resin. Examples of the ultraviolet ray curable resin may comprise, but not limited to, epoxy (meth)acrylate, urethane (meth)acrylate, phenylphenol ethoxylated (meth)acrylate, trimethylol propane ethoxylated (meth)acrylate, phenoxybenzyl (meth)acrylate, phenylphenoxyethyl (meth)acrylate, ethoxylated thiodiphenyl di(meth)acrylate, phenyl thioethyl (meth)acrylate monomer or oligomer thereof, or fluorene derivative unsaturated resin.

A material of the low refractive layer may be made by using ultraviolet ray curable resin or an acrylate-based bonding agent.

A thickness of the low refractive layer may be about 1 to 200 μm.

The viewing angle compensation film according to one exemplary embodiment of the present invention may further comprise one or more optical layers. The optical layer may be, but not limited to, an anti-glare (AG) layer, a hard coating (HC) layer, a low refractive index (LR) layer, AGLR (anti-glare & low-reflection), an anti-reflection (AR) layer, or the like.

The hard coating layer, the anti-glare (AG) layer, the low refractive index (LR) layer, the AGLR (anti-glare & low-reflection), and the anti-reflection (AR) layer may be made of a material of a primer layer which is used for general purposes. A thickness of each of the hard coating layer, the anti-glare (AG) layer, the low refractive index (LR) layer, the AGLR (anti-glare & low-reflection), and the anti-reflection (AR) layer may be 1 to 100 μm.

Figure 3:
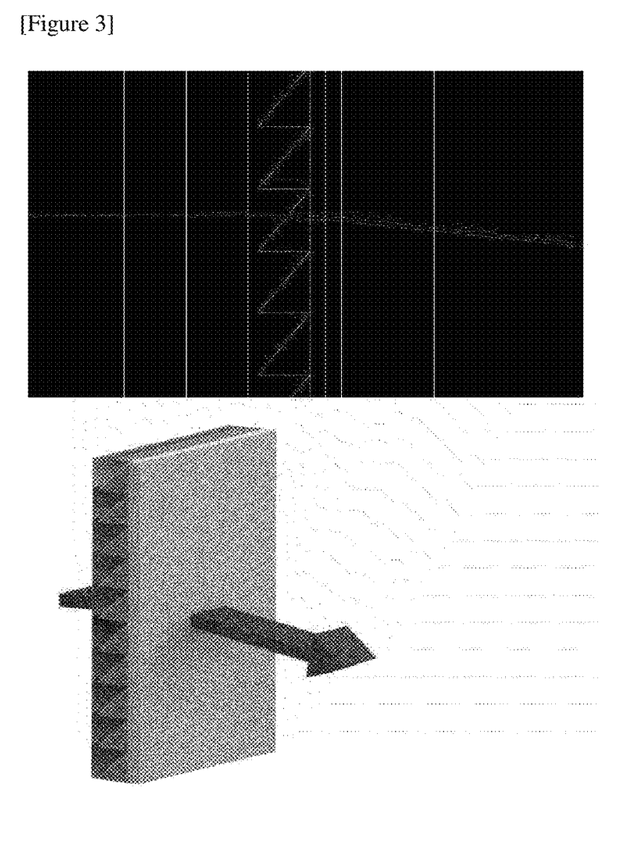
FIG. 3 is a view illustrating a route of light passing through the pattern layer.

A refraction angle of the light passing through the pattern layer of the viewing angle compensation film may be 1° to 20°. According to another exemplary embodiment, the refraction angle may be 3° to 15°. A route of the light passing through the pattern layer according to the present invention may be ascertained from FIG. 3.

A height h of the pattern layer means a vertical distance between the first surface and a tip of the protruding portion or means a distance which has a greatest value among vertical distances between the first surface and the third inclined surface in a case in which the protruding portion has the first to third inclined surfaces. The height h of the pattern layer may be 1 to 500 μm.

According to one exemplary embodiment of the present invention, the viewing angle compensation film further comprises the base film 10 disposed at the first surface side. FIG. 1 illustrates an example of the viewing angle compensation film comprising the base film 10, the pattern layer 11, and the low refractive layer 12.

Figure 2:
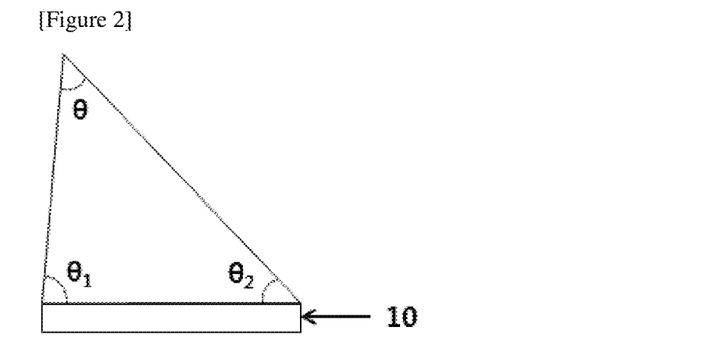
FIG. 2 is an enlarged view of a cross section of pattern layer comprised in the viewing angle compensation film according to the exemplary embodiment of the present invention.

In addition, FIG. 2 illustrates a cross section of the film having the pattern layer formed on the base film 10 and illustrates the angles $\theta$, $\theta_1$, and $\theta_2$ of the protruding portion.

The base film 10 may be, but not limited to, a film made of polyester, polyacrylic, polyvinyl chloride, polycarbonate, polymethyl methacrylate, polystyrene, polyester sulfone, polybutadiene, triacetate cellulose (TAC), cycloolefin polymer (COP), or polyethylene terephthalate (PET), an acrylic-based film, or the like.

The acrylic-based film may comprise (meth)acrylate-based resin, and the film comprising the (meth)acrylate-based resin may be obtained by molding a moldable material comprising the (meth)acrylate-based resin as a main ingredient through extrusion molding.

The acrylic-based film may be a film comprising a copolymer containing an alkyl (meth)acrylate-based unit and a styrene-based unit and an aromatic resin having a carbonate residue in the main chain, or a film comprising an alkyl (meth)acrylate-based unit, a styrene-based unit, a 3 to 6-membered heterocyclic unit having a functional group substituted with at least one carbonyl group, and a vinyl cyanide unit. In addition, the acrylic-based film may be made of acrylic-based resin having a lactone structure.

Examples of the (meth)acrylate-based resin having an aromatic ring may comprise a resin composition comprising (a) a (meth)acrylate-based unit containing at least one (meth)acrylate-based derivative; (b) an aromatic unit comprising an aromatic residue and a chain containing a hydroxyl group-containing residue; and (c) a styrene-based unit comprising at least one styrene-based derivative. The units of (a) to (c) may also be each comprised in the form of a separate copolymer in the resin composition, and two or more units among the units of (a) to (c) may also be comprised in the form of one copolymer in the resin composition.

A method of manufacturing the (meth)acrylate-based resin film is not particularly limited, and for example, the (meth)acrylate-based resin film may be prepared by sufficiently mixing a (meth)acrylate-based resin, other polymers, additives, and the like by any appropriate mixing method to prepare a thermoplastic resin composition, and then film-molding the thermoplastic resin composition, or by preparing a separate solution of other polymers, additives, and the like and mixing a (meth)acrylate-based resin with the separate solution to form a uniform mixture solution, and then film-molding the mixture.

The thermoplastic resin composition may, for example, be prepared by pre-blending film components using any suitable mixing machine such as an Omni mixer and extruding and kneading the resulting mixture. In this case, the mixing machine used for the extrusion and kneading is not particularly limited. For example, any suitable mixing machine such as an extruder, for example, a single-screw extruder or a double-screw extruder, or a dispersion kneader, may be used herein.

Examples of the method of molding a film may comprise any suitable film molding method such as a solution casting method (i.e., a solution softening method), a melt extrusion method, a calendar method, an extrusion molding method, and the like. The solution casting method (i.e., the solution softening method) and the melt extrusion method are preferable, but the present invention is not limited thereto.

A solvent used in the solution casting method (i.e., the solution softening method) may, for example, comprise aromatic hydrocarbons such as benzene, toluene, and xylene; aliphatic hydrocarbons such as cyclohexane, and decaline; esters such as ethyl acetate, and butyl acetate; ketones such as acetone, methyl ethyl ketone, and methylisobutylketone; alcohols such as methanol, ethanol, isopropanol, butanol, isobutanol, methyl cellosolve, ethyl cellosolve, and butyl cellosolve; ethers such as tetrahydrofuran, and dioxane; halogenated hydrocarbons such as dichloromethane, chloroform, and carbon tetrachloride; dimethylformamide; dimethylsulfoxide, and the like. Here, the above-described solvents may be used alone or in a combination of two or more thereof.

Examples of an apparatus for performing the solution casting method (i.e., the solution softening method) may comprise a drum-type casting machine, a band-type casting machine, a spin coater, and the like. Examples of the melt extrusion method may comprise a T-die method, an inflation method, and the like. A molding temperature may be, but not limited to, specifically 150 to 350° C., and more specifically, 200 to 300° C.

When a film is molded using the T-die method, a roll-shaped film may be obtained by installing a T-die at a leading end of a known single-screw or double-screw extruder and winding a film extruded in the form of a thin film. In this case, uniaxial stretching may be performed by properly adjusting the temperature of a winding roll and stretching the film in an extrusion direction. Also, simultaneous and sequential biaxial stretching may be performed by stretching the film in a direction perpendicular to the extrusion direction.

The acrylic-based film may be either a non-stretched film or a stretched film. In this case, the stretched film may be either a uniaxially stretched film or a biaxially stretched film, and the biaxially stretched film may be either a simultaneously biaxially stretched film or a sequentially biaxially stretched film. When the film is biaxially stretched, the performance of the film may be improved due to improved mechanical strength. Even when the acrylic-based film is extended by blending another thermoplastic resin, it is possible to suppress an increase in phase difference and maintain optical isotropy.

The stretching temperature is preferably within a range near the glass transition temperature of the thermoplastic resin composition that is a raw material of a film. Preferably, the stretching temperature is in a range of (a glass transition temperature of −30° C.) to (a glass transition temperature of +100° C.), and more preferably in a range of (a glass transition temperature of −20° C.) to (a glass transition temperature of +80° C.). There is concern that sufficient stretching magnification may not be obtained when the stretching temperature is less than (a glass transition temperature of −30° C.). On the other hand, there is concern that stable stretching may not be achieved due to the flowing of the resin composition when the stretching temperature exceeds (a glass transition temperature of +100° C.).

When the stretching magnification is defined as an area ratio, the stretching magnification may preferably be in a range of approximately 1.1 to 25 times, and more preferably in a range of approximately 1.3 to 10 times. There is concern that improvements in toughness involved in the stretching may not be realized when the stretching magnification is less than 1.1 times. There is concern that effects may not occur in an amount equal to an increase in the stretching magnification when the stretching magnification exceeds 25 times.

The stretching rate in a single direction is preferably in a range of 10 to 20,000%/min, and more preferably in a range of 100 to 10,000%/min. There is concern that when the stretching rate is less than 10%/min, a time required to reach sufficient stretching magnification may be lengthened, resulting in an increase in manufacturing costs. There is concern that the stretched film may be broken when the stretching rate exceeds 20,000%/min.

The acrylic-based film may be subjected to a thermal treatment (annealing) after the stretching in order to stabilize the optical isotropy or mechanical characteristics. The thermal treatment conditions are not particularly limited, and thus any proper conditions known in the related art may be used herein.

According to one exemplary embodiment of the present invention, a coating layer such as the anti-glare (AG) layer, the hard coating (HC) layer, the low refractive index (LR) layer, the AGLR (anti-glare & low-reflection), the anti-reflection (AR) layer, or the like may be formed on at least one surface of the base film. In this case, coating compositions for forming the layers may be used to form the layers by a method well known in the art, for example, a bar coating method, a gravure coating method, or a slot-die coating method. Although the drying process may be performed through a convection oven and the like, the drying process is not limited thereto, and is performed preferably at a temperature of 100° C. to 120° C. for 1 minute to 5 minutes. The drying temperature varies according to steps of coating the composition, and in case of a stretching-completed film, the drying process may be performed in a range in which the drying temperature does not exceed a glass transition temperature (Tg) of the film, and in the case of comprising the stretching process, the drying process may be performed at a stretching temperature at the same time as the stretching process, and the drying process is performed in a range in which the drying temperature does not exceed a decomposition temperature (Td) of the film.

One exemplary embodiment of the present invention provides a polarizing plate comprising the viewing angle compensation film.

Figure 5:
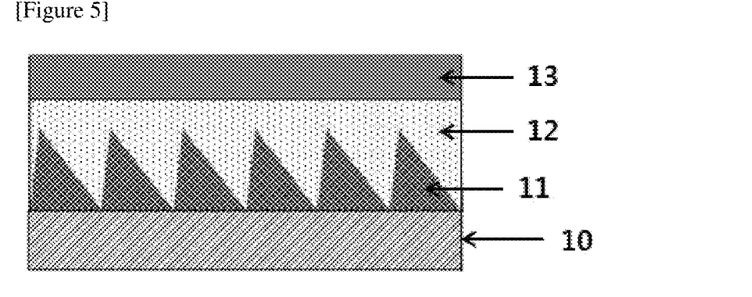
FIG. 5 is a schematic illustration of a polarizing plate comprising the viewing angle compensation film according to an embodiment of the present invention.
Figure 6:
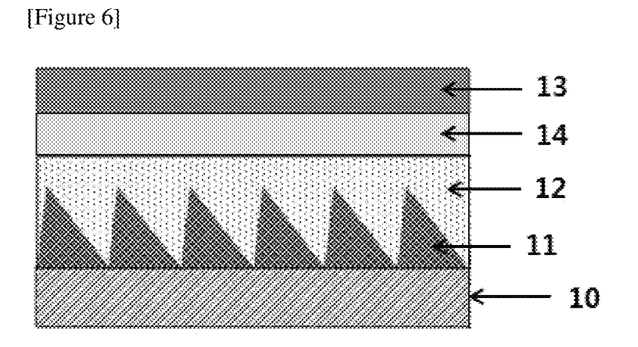
FIG. 6 is a schematic illustration of a first polarizing plate comprising the viewing compensation film according to another embodiment of the present invention.
Figure 7:
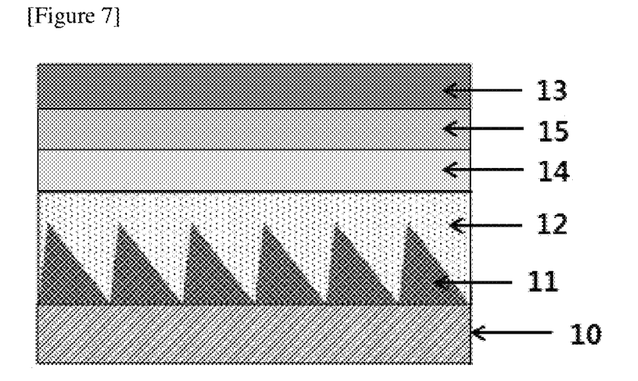
FIG. 7 is a schematic illustration of a first polarizing plate comprising the viewing compensation film according to further embodiment of the present invention.
Figure 8:
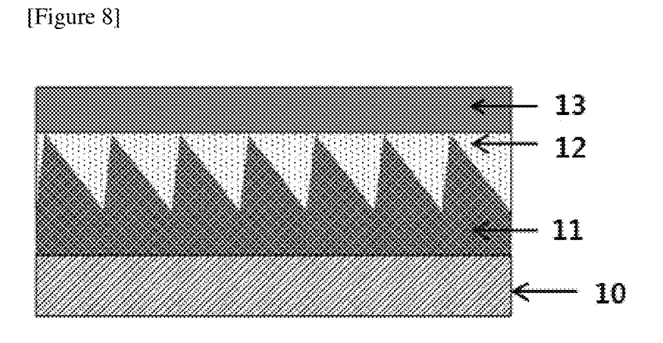
FIG. 8 is a schematic illustration of a second polarizing plate comprising the viewing angle compensation film according to an exemplary embodiment of the present invention.
Figure 9:
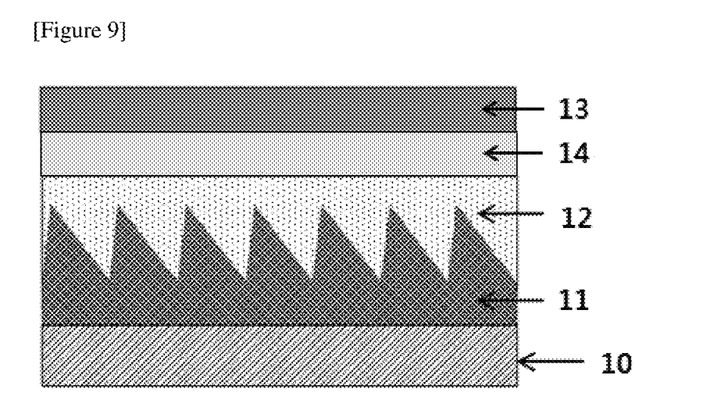
FIG. 9 is a schematic illustration of a second polarizing plate comprising the viewing angle compensation film according to another embodiment of the present invention.
Figure 10:
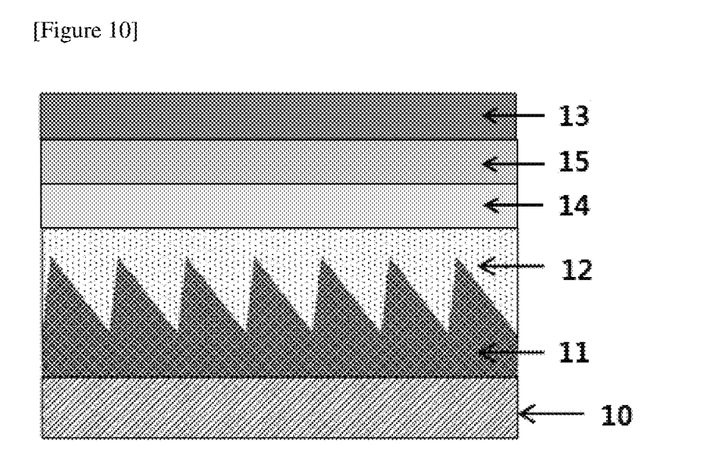
FIG. 10 is a schematic illustration of a second polarizing plate comprising the viewing angle compensation film according to a further embodiment of the present invention.

FIGS. 5 to 7 illustrate a first polarizing plate comprising the viewing angle compensation film according to one exemplary embodiment of the present invention, and FIGS. 8 to 10 illustrate a second polarizing plate comprising the viewing angle compensation film according to one exemplary embodiment of the present invention.

FIGS. 5 and 8 illustrate the polarizing plate in which the base film 10, the pattern layer 11, the low refractive layer 12, and a polarizer 13 are sequentially laminated.

FIGS. 6 and 9 illustrate the polarizing plate in which the base film 10, the pattern layer 11, the low refractive layer 12, a first optical layer 14, and the polarizer 13 are sequentially laminated.

FIGS. 7 and 10 illustrate the polarizing plate in which the base film 10, the pattern layer 11, the low refractive layer 12, the first optical layer 14, a second optical layer 15, and the polarizer 13 are sequentially laminated.

In this case, the polarizing plate comprises the polarizer. The polarizer is not particularly limited, and a polarizer well-known in the art, for example, a film composed of polyvinyl alcohol (PVA) comprising iodine or a dichroic dye is used.

The polarizer exhibits a property capable of extracting only light vibrating in one direction from the light being incident while vibrating in various directions. This property may be achieved by stretching iodine-adsorbed PVA (polyvinyl alcohol) with a strong tensile force. For example, more specifically, a polarizer may be formed through a step of swelling a PVA film by immersing the PVA film in an aqueous solution, a step of dyeing the swollen PVA film with a dichroic material imparting polarizing properties, a step of stretching the dyed PVA film so that the dichroic dye material is arranged in parallel with the stretching direction, and a step of correcting the color of the PVA film which has undergone the stretching step. However, the polarizing plate according to the present invention is not limited thereto.

In addition, the polarizing plate may have a general-purpose polarizer protecting film typically used for one surface or both surfaces of the polarizer.

The viewing angle compensation film may be provided at an outermost side of the polarizing plate.

One exemplary embodiment of the present invention provides a screen display device comprising: a liquid crystal cell; a first polarizing plate which is provided at a visual field side of the liquid crystal cell; a second polarizing plate which is provided at the opposite side to the visual field side of the liquid crystal cell; and a back light unit which is provided at a side of the second polarizing plate opposite to a side that faces the liquid crystal cell, in which the first polarizing plate or the second polarizing plate comprises the above-mentioned viewing angle compensation film.

In one exemplary embodiment of the present invention, the screen display device may be a display device for a vehicle.

According to one exemplary embodiment of the present invention, the viewing angle compensation film may be provided at an outermost side of the first polarizing plate or the second polarizing plate.

In another exemplary embodiment, the viewing angle compensation film may be provided on the second polarizing plate, and in this case, there is an advantage in that color separation is diminished.

As one example, the first polarizing plate may comprise the viewing angle compensation film, and the second surface may be disposed to be close to the liquid crystal cell. In addition, the second polarizing plate may comprise the viewing angle compensation film, and the second surface may be disposed to be close to the liquid crystal cell.

A main viewing angle (maximum brightness angle) of the display device varies, and a degree of light concentration is increased, such that a contrast ratio (CR) may be improved at a position which is not parallel to the display device.

The backlight unit comprises a light source which emits light from a back side of the liquid crystal panel, the type of light source is not particularly limited, and a light source such as a CCFL, an HCFL, or an LED for a general LCD may be used.

Hereinafter, operations and effects of the present invention will be described in more detail with reference to specific examples according to the present invention. However, these examples are given to merely illustrate the present invention and are not intended to limit the scope of the present invention.

EXAMPLES

Experimental Example 1

Example 1

As illustrated in the lower side in FIG. 1, the viewing angle compensation film in which the base film 10, the pattern layer 11, and the low refractive layer 12 are sequentially laminated was configured, a simulation was performed, and brightness with respect to viewing angles was measured by using EZContrast x188 Equipment and Lighttools of Eldim.

1) Pattern Layer: the angle $\theta$ between the first inclined surface and the second inclined surface is 40°, the angle $\theta_1$ between the first inclined surface and the first surface is 90°, and the angle $\theta_2$ between the second inclined surface and the first surface is 50° (the refractive index at a wavelength of 550 nm is 1.56).

2) Low Refractive Layer: provided on the upper portion of the pattern layer (the refractive index at a wavelength of 550 nm is 1.49)

Comparative Example 1

A simulation was performed after configuring the viewing angle compensation film identical to the viewing angle compensation film according to Example 1 except that the angle $\theta$ was 90°, the angle $\theta_1$ was 5°, and the angle $\theta_2$ was 85°, unlike Example 1.

Comparative Example 2

A simulation was performed after configuring the viewing angle compensation film identical to the viewing angle compensation film according to Example 1 except that the angle $\theta_1$ was 5° and the angle $\theta_2$ was 5°, unlike Example 1.

Comparative Example 3

A simulation was performed after configuring the viewing angle compensation film identical to the viewing angle compensation film according to Example 1 except that the refractive index of the pattern layer was 1.50 and the refractive index of the low refractive layer was 1.49, unlike Example 1.

Figure 4:
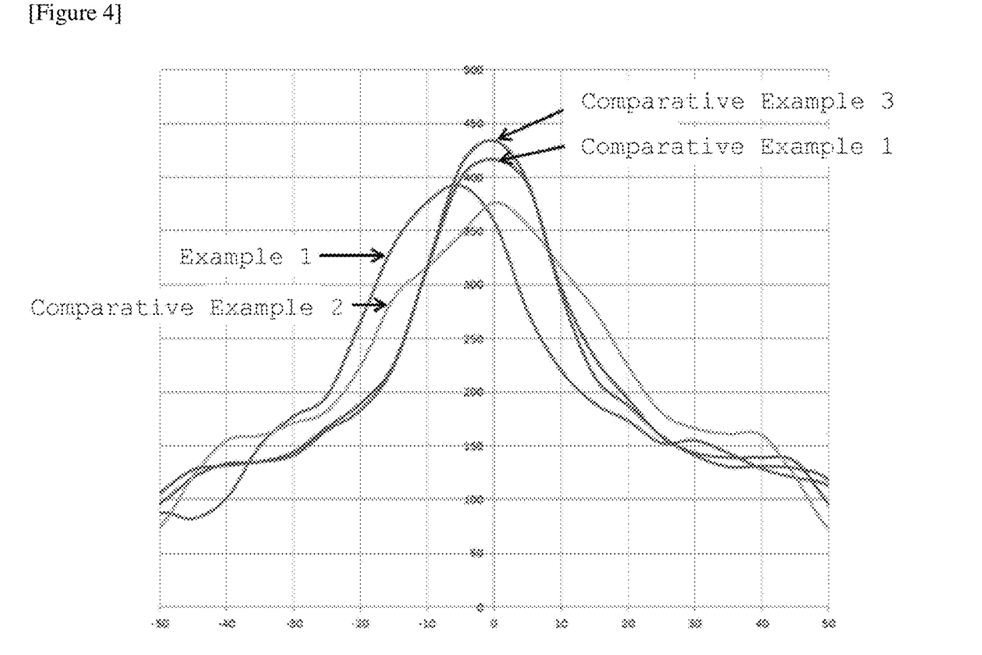
FIG. 4 is a view illustrating an experimental result of Experimental Example 1.

Measured values according to Example 1 and Comparative Examples 1 to 3 are illustrated in FIG. 4. In FIG. 4, the horizontal axis indicates the viewing angles, and the vertical axis indicates brightness (nit).

It can be ascertained from FIG. 4 that Example 1 may obtain a wider viewing angle than Comparative Examples 1 and 3, a maximum brightness value is made in a direction of about −5° based on the front side, and as a result, it is possible to obtain a clear image within a driver's visual field when the viewing angle compensation film is applied to a display for a vehicle.

In addition, it can be ascertained that clarity of an image observed within the drivers visual field deteriorates in Comparative Example 2 because a brightness value is small in the vicinity of an angle of −5° in comparison with Example 1.

Experimental Example 2

Example 2

A simulation was performed after configuring the display device comprising the viewing angle compensation film according to Example 1 of Experimental Example 1.

Comparative Example 4

A simulation was performed after configuring the display device identical to the display device according to Example 2 except that no viewing angle compensation film is comprised unlike Example 2.

Simulation Measurement Equipment and Condition

Figure 11:
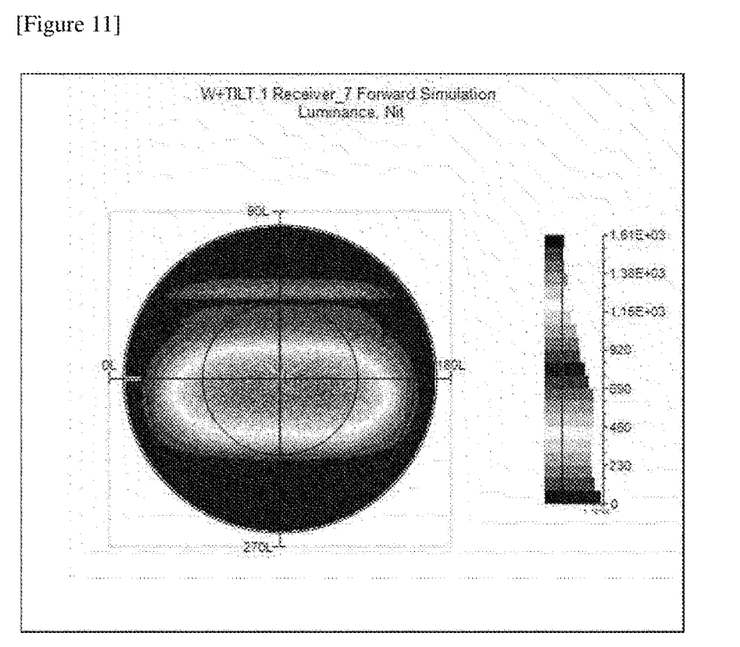
FIG. 11 illustrates measured white brightness (luminance white, Lw) of an experimental result of Example 2.
Figure 12:
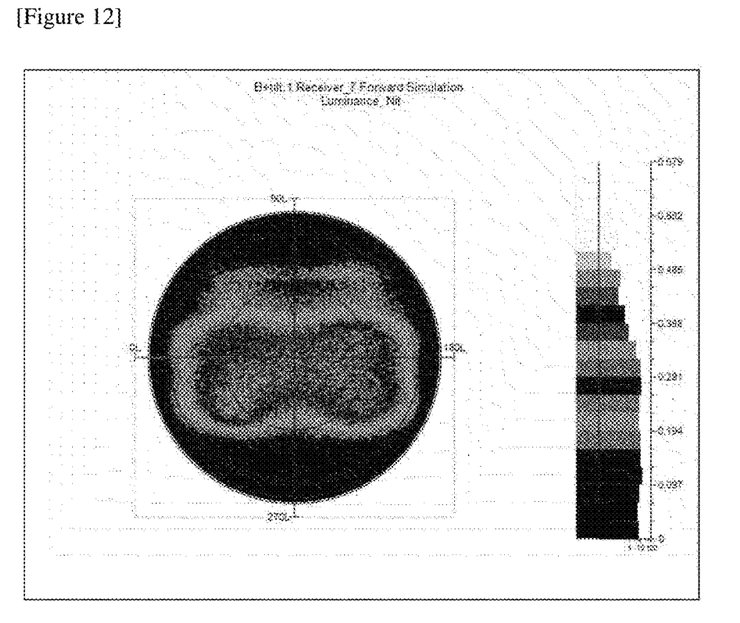
FIG. 12 illustrates measured black brightness (luminance black, Lb) of an experimental result of Example 2.
Figure 13:
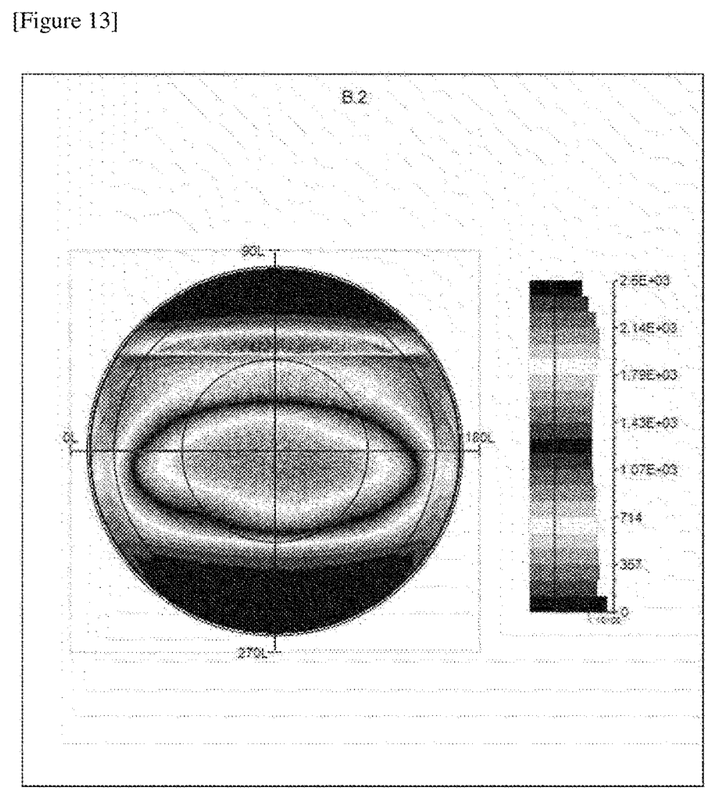
FIG. 13 illustrates Lw/Lb of an experimental result of Example 2.
Figure 14:
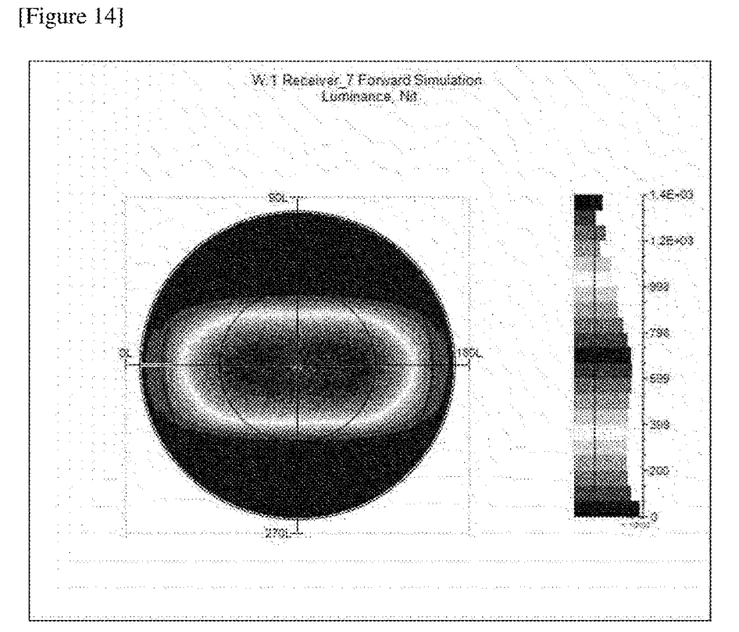
FIG. 14 illustrates measured white brightness (luminance white, Lw) of an experimental result of Comparative Example 4.
Figure 15:
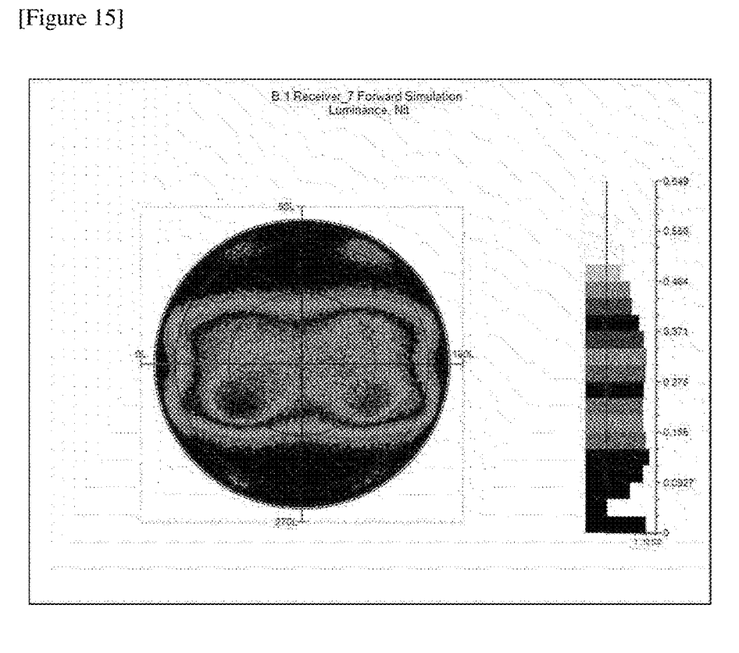
FIG. 15 illustrates measured black brightness (luminance black, Lb) of an experimental result of Comparative Example 4.
Figure 16:
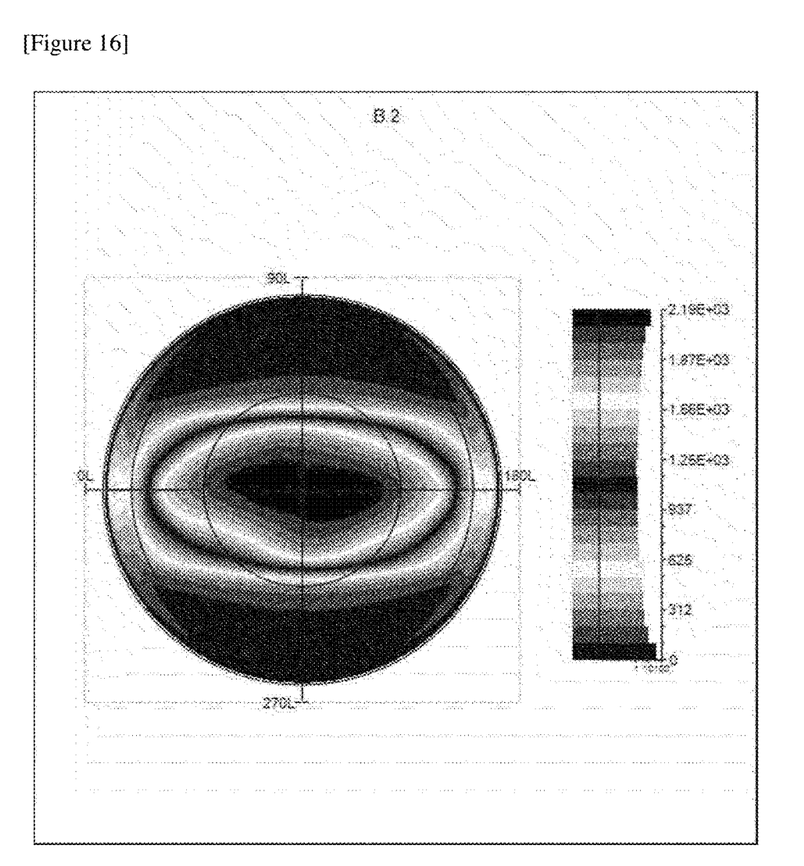
FIG. 16 illustrates Lw/Lb of an experimental result of Comparative Example 4.
Figure 17:
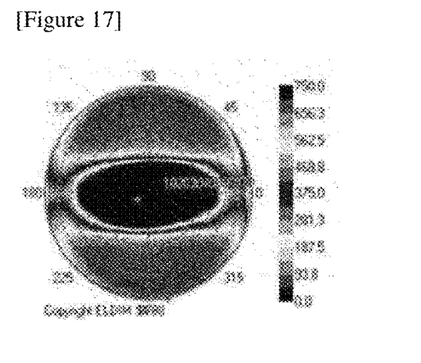
FIG. 17 is a view illustrating a CR curve of Comparative Example 4.
Figure 18:
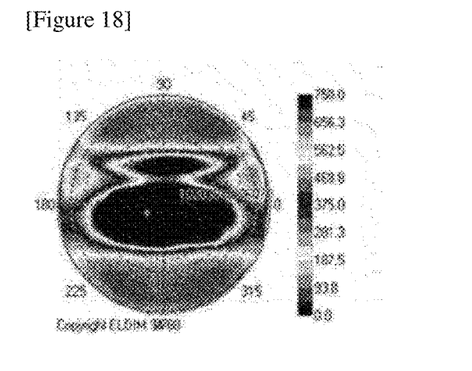
FIG. 18 is a view illustrating a CR curve of Example 2.

A distribution of viewing angles in on/off states of a panel (white/black modes) was measured and the CR was calculated by using EZContrast x188 Equipment of Eldim, and a result thereof is shown in Table 1. In addition, experimental results of Example 2 are illustrated in FIGS. 11 to 13, and 18, and experimental results of Comparative Example 4 are illustrated in FIGS. 14 to 17. The following FIGS. 11 and 14 are views illustrating measured white brightness (luminance white, Lw), FIGS. 12 and 15 are views illustrating measured black brightness (luminance black, Lb), and FIGS. 13 and 16 are views illustrating Lw/Lb. In addition, the following FIG. 17 is a view illustrating a CR curve according to Comparative Example 4, and FIG. 18 is a view illustrating a CR curve according to Example 2.

TABLE 1

|  | Comparative Example 4 | Example 2 |
| --- | --- | --- |
| Front CR | 1568 | 1667 |
| Area A* CR Upper Right/Upper Left/ Lower Right/Lower Left | 673/580/1092/1032 | 871/911/977/994 |
| Area A CR Upper Right/Upper Left/ Lower Right/Lower Left | 739/646/1120/1006 | 336/355/1296/1199 |

It can be ascertained from Table 1 that a contrast ratio (CR) of the display device according to Example 2 is higher than a contrast ratio of the display device according to Comparative Example 4, and a viewing angle is improved when the viewing angle compensation film according to the present invention is comprised.

The invention claimed is:

1. A screen display device comprising:

a liquid crystal cell;

a first polarizing plate which is provided at a visual field side of the liquid crystal cell;

a second polarizing plate which is provided at the opposite side to the visual field side of the liquid crystal cell; and a backlight unit which is provided at a side of the second polarizing plate opposite to a side that faces the liquid crystal cell, wherein the first polarizing plate or the second polarizing plate comprises a viewing angle compensation film comprising:

a pattern layer; and a low refractive layer, wherein a difference in refractive index between the pattern layer and the low refractive layer is 0.02 to 0.4, wherein the pattern layer comprises:

a first surface which comprises a flat surface; and a second surface which faces the first surface and comprises multiple protruding portions, a plurality of grooves defined between the multiple protruding portions, wherein each of the grooves are entirely filled by the low refractive layer, each of the protruding portions comprises a first inclined surface and a second inclined surface, an angle $\theta_1$ between the first surface and the first inclined surface or a surface extending from the first inclined surface and an angle $\theta_2$ between the first surface and the second inclined surface or a surface extending from the second inclined surface, wherein $\theta_1$ and $\theta_2$ are different from each other, and an angle θ between the first inclined surface or the surface extending from the first inclined surface and the second inclined surface or the surface extending from the second inclined surface, is 20° to 60°, wherein the angle $\theta_1$ is 60° to 90°, and wherein the second surface of the pattern layer is disposed to be close to the liquid crystal cell.

2. The screen display device of claim 1, wherein the viewing angle compensation film is provided at an outermost side of the first polarizing plate or the second polarizing plate.

* * * * *